Patented Apr. 18, 1939                                          2,154,452

UNITED STATES PATENT OFFICE 2,154,452

METHOD OF CONTROLLING THE PLASTICITY OF HYDROGENATED GLYCERIDE OIL

Leslie G. Jenness, Brooklyn, N. Y., assignor to Intermetal Corporation, Newark, N. J., a corporation of Delaware No Drawing. Application April 11, 1936, Serial No. 73,934

10 Claims. (Cl. 99—118)

This invention relates to a method of controlling the plasticity of semi-solid fats produced by hydrogenating glyceride oils and the product resulting therefrom, and more particularly to a method of controlling the plasticity of semi-solid fats prepared from glyceride oils containing substantial quantities of acid radicals of other than the $C_{18}$ acids, and the resulting product.

As an example of oils containing substantial quantities of other than $C_{18}$ acid radicals, the fish oils of commerce are made up of a mixture of glycerides having $C_{18}$, $C_{20}$ and $C_{22}$ acid radicals with a small amount of $C_{14}$ radicals, in which the $C_{20}$ and $C_{22}$ acid radicals are present in substantial amounts. These fish oils also contain large quantities of higher unsaturates, such as acid radicals with three, four and five double bonds, and probably radicals containing triple bonds are present.

In my copending application, Serial No. 44,635, filed October 11, 1935, I have disclosed how such higher unsaturates of glyceride oils can be eliminated and mixed glyceride molecules formed in the liquid oil, in order to form a stable liquid oil, and I have further disclosed how, after such pretreatment, the liquid oil can be converted into a highly stable semi-solid fat by a further hydrogenation. This pretreatment largely determines the stability of the semi-solid fat as the final stability of the fat depends upon the stability of the pretreated liquid oil and the extent to which acid radicals having more than one double bond remain in the fat. In general, a more stable semi-solid fat can be produced by pretreatment of the liquid oil if the stability of the liquid glyceride oil can be improved by the pretreating operation.

For shortening purposes, semi-solid fats must have suitable plasticity; that is, the congeal point and the Wiley melting point must differ considerably, so that the fat assumes a plastic condition between the temperature at which the fat congeals and the temperature at which the fat melts. The plasticity of semi-solid fats produced from oils which are almost entirely composed of glycerides having $C_{18}$ acid radicals, such as the vegetable oils of commerce, can be controlled by the nature of the hydrogenation following the pretreatment operation. By lowering the temperature of hydrogenation and increasing the rate of hydrogenation in the final hydrogenation of such oils, the congeal point and the Wiley melting point may be made to diverge, and a semi-solid fat of desired plasticity produced. In general, the lower the temperature of the final hydrogenation and the faster the rate, the greater will be the plasticity of the semi-solid fat and the stability will not be measurably decreased unless the temperature is decreased and the rate of hydrogenation increased to such an extent that relatively large quantities of acid radicals having two double bonds remain in the oil. Also such low temperatures and high rate of hydrogenation may produce a product having too much plasticity. In accordance with this invention, highly stable fats having desirable plasticity can be produced.

The plasticity of the $C_{18}$ glyceride oils may also be increased by discontinuing the final hydrogenation before fat of the hardness desired is obtained and then adding a small percentage of vegetable oil stearin, or by adding vegetable stearin before hydrogenation, and then bringing the fat down to the desired consistency. By the latter procedure, the temperature of hydrogenation and the rate of hydrogenation may be maintained sufficiently high in the final hydrogenation to reduce the acid radicals having two double bonds to a desired minimum in order to obtain stability and still produce a product of the required plasticity.

However, with oils containing mixtures of $C_{18}$, $C_{20}$ and $C_{22}$ acid radicals in which the radicals of higher molecular weight are substantially all unsaturated, neither of these procedures materially affect the plasticity of the semi-solid fat. I have discovered that in hydrogenating such oils solid fats having the same number of carbon atoms in their acid radicals as the radicals of the unsaturated components of the oils being hydrogenated, must be added to the process either before or after hydrogenation in order to increase the plasticity of the resulting semi-solid fat. For example, in the case of fish oil which contains unsaturated $C_{20}$ and $C_{22}$ acid radicals in substantial proportions, as well as $C_{18}$ acid radicals, a solid fat containing $C_{20}$ or $C_{22}$, or at least one of these radicals, in substantial quantity, must be added.

As stated above, this solid fat may be added at any time during the process and within the range of fat hardness suitable for shortening purposes, the result is substantially the same whether the solid fat is added before pretreatment, after final hydrogenation, or at an intermediate stage. If added before or during hydrogenation, the fat is brought down to the desired consistency by the final hydrogenation, or if added after the final hydrogenation, this final hydrogenation is merely carried far enough so that the addition of the solid fat will produce the desired consistency. A convenient source of solid fats having the desired acid radicals is the fat resulting from the substantially complete hydrogenation of the oil being treated. Thus, in order to control plasticity of hydrogenated fish oil, or mixtures of fish and vegetable oils, substantially completely hydrogenated fish oil may be added.

As a specific example of the practice of the present invention, an oil blend containing 70 parts of whole fish oil, 22 parts of soya bean oil and 8 parts of coconut oil, after being pretreated at 320° F. in accordance with the process of my above-mentioned copending application, was hydrogenated at a temperature of 260° F., also in accordance with the process disclosed in my said copending application, to an iodine number of 72.5 where it showed a Wiley melting point of 32.5 C., and a congeal point of 25° C., or a difference of 7.5° C.

These congeal and melting points are, however, too close together to produce the required plasticity. The blended oils were used in order to show the effect of even a reduced amount of $C_{20}$ and $C_{22}$ acid radicals and, furthermore, coconut oil is known to be favorable to increase plasticity. Even under these favorable conditions in which the amount of $C_{20}$ and $C_{22}$ acid radicals had been reduced and coconut oil employed, and an extremely low temperature of hydrogenation used, still the resultant semi-solid fat was not sufficiently plastic.

To this semi-solid fat, 2% of solid fat, prepared by substantially completely rydrogenating fish oil to the saturated state, was added. The resultant product possessed an iodine number of 70, a Wiley melting point of 37° C., and a congeal point of 27° C., or a difference of 10° C. The plasticity of this product was entirely in line with commercial shortenings having satisfactory plasticity.

As another specific example, a blended oil having the same proportions of fish oil, soya bean oil and coconut oil was hydrogenated under the same conditions but two parts of completely hardened fish oil was added before hydrogenation. The resulting characteristics were almost identical, at iodine numbers of 70 and 72, with those of the former example to which hardened fish oil had been added after hydrogenation. Further hydrogenation caused a higher congeal point in the presence of the hardened fish oil than occurred when the oil was hydrogenated to the corresponding point before adding the hardened fat.

The reasons why the addition of solid fat having acid radicals with the same number of carbon atoms as the oil being hydrogenated is necessary to improve plasticity, are probably as follows.

I have found that in oils containing mixtures of glycerides having acid radicals of different numbers of carbon atoms, the hydrogenation under conditions favorable to producing increased plasticity is selective as to the radicals containing the lowest number of carbon atoms. Thus, in fish oils, the $C_{14}$ and $C_{18}$ acid radicals hydrogenate in preference to the acid radicals of high molecular weight, such as the $C_{20}$ and $C_{22}$ acid radicals. In a semi-solid fat produced from fish oil or blends containing substantial amounts of $C_{20}$ and $C_{22}$ acid radicals, the solid phase is composed largely of glycerides having $C_{14}$ and $C_{18}$ acid radicals, and the liquid phase is composed largely of glycerides containing $C_{20}$ and $C_{22}$ acid radicals. It is probable that a divergence of the Wiley melting point and the congeal point is caused by a solution of saturated fats in the unsaturated liquid oils, and that solid fats of a given molecular weight are more soluble in liquid oils of the same molecular weight. Thus, adding a $C_{18}$ solid fat to a semi-solid fat containing $C_{20}$ and $C_{22}$ liquid oils does not substantially increase the solution of solid fats in the liquid oil. However, when $C_{20}$ and $C_{22}$ solid fats are added, these readily dissolve in the $C_{20}$ and $C_{22}$ liquid oils and the plasticity of the semi-solid fat increases due to the divergence of the Wiley melting point and congeal point caused thereby. Thus, it is necessary to add a solid fat containing acid radicals of the same number of carbon atoms as that of the liquid phase of the oil.

In the claims, the expression "incorporating with said semi-solid fat", is employed to cover and embrace adding the solid fat either before or after hydrogenation or at an intermediate stage of the hydrogenation.

While I have disclosed the preferred embodiments of my invention, and have given a theory of operation, it is understood that the present invention is not to be limited to any precise theory of operation, nor it is to be limited to fish oils or the details of the present disclosure, but may be varied within the scope of the following claims.

I claim as my invention:

1. The method of controlling the plasticity of a hydrogenated semi-solid fat prepared from glyceride oils including substantial quantities of $C_{18}$ acid radicals and substantial quantities of other than $C_{18}$ acid radicals, which comprises adding to said fat a substantially completely saturated solid fat containing substantial quantities of acid radicals having the same number of carbon atoms as the acid radicals of the oil being hydrogenated which have the greater number of carbon atoms.

2. The method of controlling the plasticity of a semi-solid fat prepared by partially hydrogenating fish oils containing substantial amounts of acid radicals having different numbers of carbon atoms therein, which comprises incorporating with said semi-solid fat a substantially completely hydrogenated fish oil containing substantial quantities of acid radicals having the same number of carbon atoms as the acid radicals of the partially hydrogenated oil which have the greater number of carbon atoms.

3. The method of controlling the plasticity of a semi-solid fat prepared by hydrogenating glyceride oils containing substantial quantities of $C_{20}$ and $C_{22}$ acid radicals and other acid radicals substantially all of which contain less than 20 carbon atoms, which comprises incorporating with said semi-solid fat a substantially completely saturated solid fat containing substantial quantities of saturated $C_{20}$ and $C_{22}$ acid radicals.

4. The method of increasing the plasticity of a semi-solid fat prepared by hydrogenating fish oil, which comprises adding a solid fat prepared by substantially completely hydrogenating fish oil to the fish oil being hydrogenated.

5. The method of increasing the plasticity of semi-solid fats prepared by hydrogenating a glyceride oil containing substantial amounts of acid radicals having different numbers of carbon atoms therein, which comprises incorporating with said semi-solid fat, a substantially completely saturated solid fat containing acid radicals having the same number of carbon atoms as the acid radicals of the hydrogenated oil which have the greater number of carbon atoms.

6. The method of increasing the plasticity of a semi-solid fat prepared by hydrogenating a glyceride oil containing substantial quantities of $C_{18}$ acid radicals and substantial quantities of other than $C_{18}$ acid radicals, which comprises incorporating with said semi-solid fat a fat containing substantial amounts of saturated acid radicals having the same number of carbon atoms as those of said glyceride oil which have the greater number of carbon atoms.

7. The method of increasing the plasticity of a semi-solid fat prepared by hydrogenating a glyceride oil containing substantial quantities of $C_{18}$ acid radicals and substantial quantities of other than $C_{18}$ acid radicals, which comprises adding to said glyceride oil during hydrogenation, a fat containing substantial amounts of saturated acid radicals having the same number of carbon atoms as those of said glyceride oil which have the greater number of carbon atoms.

8. The method of increasing the plasticity of a semi-solid fat prepared by hydrogenating a glyceride oil including substantial quantities of $C_{18}$ acid radicals and substantial quantities of other than $C_{18}$ acid radicals, which comprises adding to the semi-solid fat a fat containing substantial amounts of saturated acid radicals having the same number of carbon atoms as those of said glyceride oil which have the greater number of carbon atoms.

9. The method of increasing the plasticity of semi-solid fats prepared by hydrogenating glyceride oils containing $C_{18}$ acid radicals and substantial amounts of another acid radical having a greater number of carbon atoms than said $C_{18}$ radicals, which comprises incorporating with said semi-solid fat, a fat containing substantial amounts of saturated acid radicals having the same number of carbon atoms as said other acid radical.

10. The method of increasing the plasticity of semi-solid fats prepared by hydrogenating glyceride oils containing substantial amounts of acid radicals having different numbers of carbon atoms, the step which comprises incorporating with said semi-solid fat, a fat containing a substantial amount of saturated acid radicals having carbon atoms corresponding in number to the radicals of said oil having the greatest number of carbon atoms.

LESLIE G. JENNESS.